July 20, 1954

H. A. QUIST 2,684,076

EMERGENCY SAFETY VALVE

Filed Dec. 1, 1951

*INVENTOR.*
HAROLD A. QUIST

BY

*Busser and Smith*

ATTORNEYS

July 20, 1954
H. A. QUIST
2,684,076
EMERGENCY SAFETY VALVE
Filed Dec. 1, 1951
2 Sheets-Sheet 2
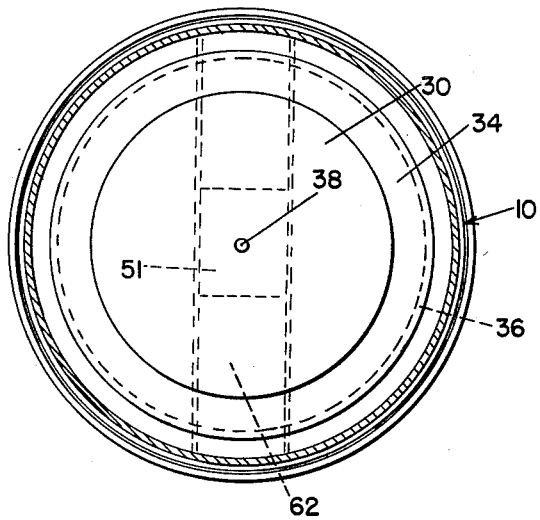
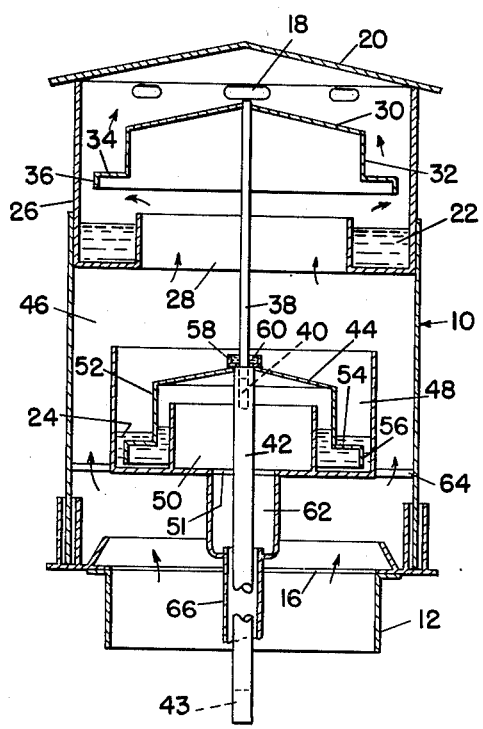
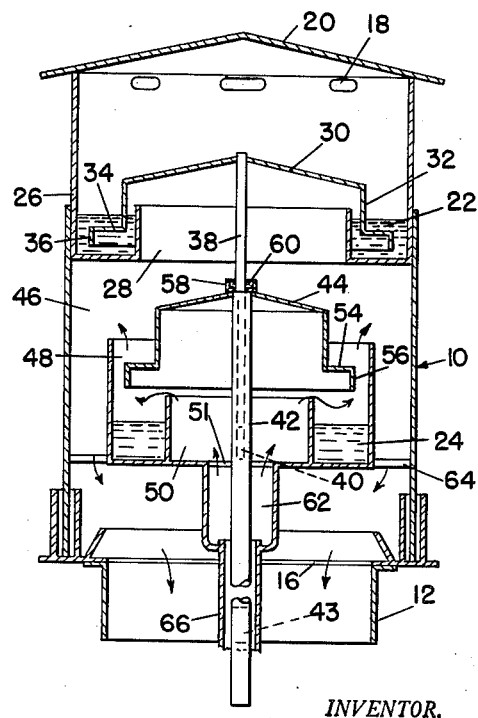
INVENTOR.
HAROLD A. QUIST
BY
ATTORNEYS

Patented July 20, 1954

2,684,076

UNITED STATES PATENT OFFICE 2,684,076

EMERGENCY SAFETY VALVE

Harold A. Quist, Swarthmore, Pa., assignor to Sun Oil Company, Philadelphia, Pa., a corporation of New Jersey Application December 1, 1951, Serial No. 259,467

6 Claims. (Cl. 137—248)

This invention relates to pressure control devices in general and more particularly to pressure and vacuum relief valves adapted for use with liquid storage vessels.

Valves used for relief purposes take various forms and apply a wide variety of physical means to perform the operations of pressure and vacuum relief. The particular type of valve to which this invention relates, however, is of the reciprocatory type and operates in conjunction with a liquid seal. This valve form is well-known in the art and is used in tandem normally having a pressure relief valve superimposed over a vacuum relief valve. In the known art, the pressure to be relieved, either above or below atmospheric pressure, is admitted between the valves. This construction, it is readily understood, subjects the upper valve to the positive pressure while the lower valve responds to negative pressure. As an assistance to the vacuum relieving valve, atmosphere is admitted as the operating force. Thus the structure for proper operation normally assumes a T form with the atmosphere admitted to the bottom, the pressure vented from the top, and the connection to the storage vessel to be relieved enter between the two responsive valve elements. It is an object of this invention to provide an improved pressure-vacuum type of venting apparatus which provides a pressure relief passage vertically through the valve housing and eliminates entirely the necessity for directing the pressure specifically between the valve elements.

Reciprocatory valves used in this art, operating to and from contact with liquid seals, normally require a guiding means to prevent them from being partially or wholly blocked from reseating after operation, and in addition require a controlling means which will prevent them from being lifted entirely out of operating position by the pressure. It will be recognized that these conditions are emphasized in the type of relief valve described in this application due to the admission of the tank pressure below both valves. Consequently, it is a further object of this invention to provide guiding and control means for a pressure relief valve wherein tandem pressure and vacuum operating valve elements are positioned longitudinally of the pressure relief passage and limited to the proper operating lift.

The present invention provides a housing preferably cylindrical in shape which is open at both the top and bottom and arranged for easy mounting on a pressure vessel. Within the housing a pair of liquid seal reciprocatory operating valves of the inverted bell type are arranged, spaced apart vertically so that the pressure relief valve is superimposed relative to the vacuum relief valve. The upper, or pressure relief valve, is in complete peripheral contact with the inner wall of the housing by arranging the liquid seal in the form of a peripheral trough and allowing a pressure relief passage through the center. This valve element is normally closed in sealing contact with the peripheral liquid seal thereby closing the relief passage through the seal, and, incidentally, sealing the housing.

The lower, or vacuum vent valve, is of the same liquid seal type, having an inverted bell type valve element normally in sealing engagement with the liquid, but is peripherally spaced from the walls of the housing allowing a pressure relief passage through the housing open at all times to exert a pressure on the pressure relief valve above. There is also a centrally disposed passage through the vacuum vent valve liquid seal similar to that described for the pressure relief valve, which is normally closed by the inverted bell type valve element of the vacuum vent valve. A transverse passage opening through the walls of the housing, otherwise closed to the pressure passage around the vacuum vent valve, is open to the central passage of the vacuum vent valve and admits atmospheric pressure under the vacuum valve element at all times.

As a guiding and control means to insure the proper operation of the two valves above described an arrangement of aligned slidably engaging rods and tubes are connected to the valve elements to insure proper positioning. A rod extending downwardly from the pressure relief valve slidably enters a tube extending through the vacuum vent valve element into a liquid sealing engagement. Both the rod and the tube of the valve elements are arranged to slide in operating engagement into and out of a centrally positioned receiving tube which is part of the housing and secured thereto. Finally the control of the valve elements to prevent excessive pressure or vacuum conditions from dislodging the valve elements is an interchangeable weight means provided for connection to the guide rod and guide tube of the respective valves. These weights may be varied to suit the pressure and vacuum conditions under which the valve operates.

In order to facilitate an understanding of the invention, reference is made to the accompanying drawings which are to be considered exemplary thereof and the detailed description which accompanies them.

Figure 3 is a plan view in section of Figure 2 along line 3—3.

Figure 4 is an elevational view in section showing the operation of the relief valve under pressure conditions.

Figure 5 is an elevational view in section showing the operation of the valve for vacuum venting.

Figure 1:
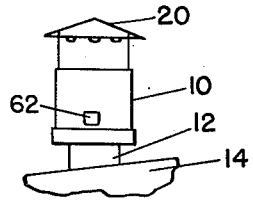
Figure 1 is an elevational view of the improved device as it appears in operating position on a storage vessel.

Referring to Figure 1, the numeral 10 designates the valve body or housing in which the pressure and vacuum relief valves are vertically arranged one above the other for the venting operation. A connecting flange 12 is shown as one approved way of mounting the device on a storage vessel 14. The lower opening 16 in the housing 10 permits the transfer of pressures, both positive and negative, from the storage vessel 14 to the body of the housing 10, while the apertures 18 in the top of the housing open the upper part thereof for the relief of positive pressures to the atmosphere. A transverse passage 62 is shown in the body of the housing which also admits atmospheric pressure constantly to the vacuum responsive valve as will be more fully understood later. It will be understood throughout this specification that the use of the word "pressure" is intended to include all conditions of positive pressures, i.e., any pressure above atmospheric pressure, while the use of the term "vacuum" is intended to embrace all negative pressures or pressure below atmospheric pressure conditions.

Figure 2:
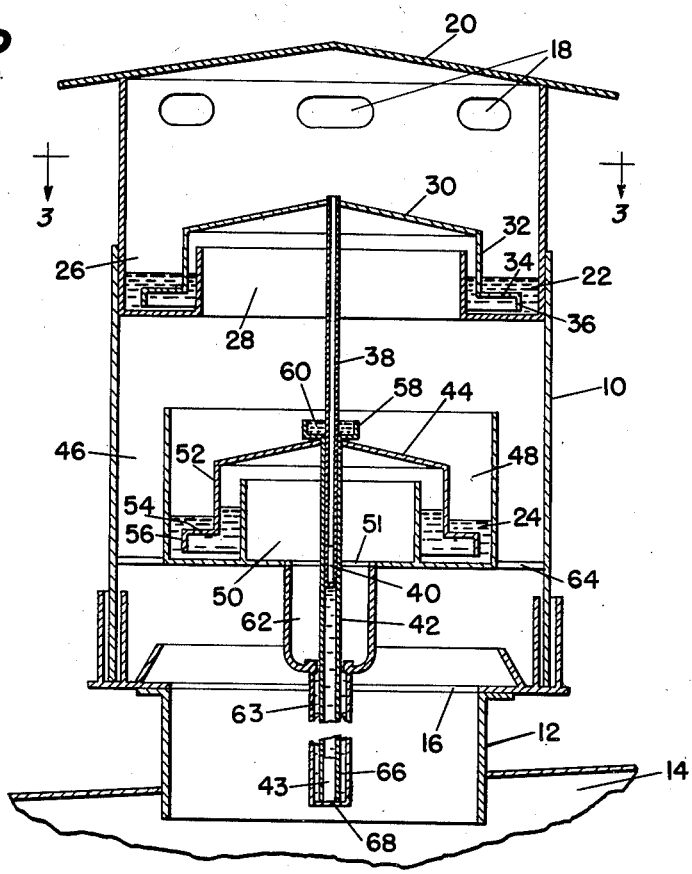
Figure 2 is an elevational view in section of the device illustrating the normal position of the valve elements.

Continuing with reference to Figure 2, the top of the housing 10, noted above as being preferably cylindrical in shape but which may be of any desired shape suitable for the particular operation, is closed by a roof 20, noted here as being pitched to shed water and thus prevent dilution of the liquid seals 22 and 24 used in the respective valves. The liquid 22 which may be glycol, glycerine, light lubricating oils, or any other non-freezing, noninflammable and preferably nonevaporating liquid is contained in the trough 26 which is opened through the center allowing the passageway 28 for the relief of pressure. It is noteworthy that the trough 26 is fabricated as a part of the upper section of the housing 10 as an easy form of construction, but need not be as it can readily be fabricated separately and welded to the inner wall of a unitary housing.

The reciprocatory operating inverted bell type valve element 30 is shown here as concentrically positioned within the housing 10 and extending downwardly, in normal position, to engage the sealing liquid 22 in the peripherally positioned trough 26. The downwardly extending wall 32 of the inverted bell type valve element 30 is terminated at the liquid contact perimeter by a horizontally extending flange 34 and a vertically connected lip 36. This particular shaping of the inverted bell type valve element 30 lends to precise and positive operation which will be described later.

A rod 38, shown here as hollow but which may be solid, is connected to the valve element 30 and extends downwardly through the center aperture 28 of the trough seal 26 into the lower section of the housing 10. The weight 40, interchangeable with other weights of greater or less value depending upon the operating pressures to be controlled, is shown affixed to the bottom of the rod 38 as it extends into sliding engagement with the tube 42 in the vacuum valve or lower section of the device.

The lower section of the housing 10, considering the liquid seal trough 26 as dividing the housing into upper and lower sections, positions the vacuum relief valve as part of this vertically arranged tandem device. A liquid seal trough 48 adapted to maintain the liquid 24 at sealing level for cooperation with the vacuum valve element 44 is peripherally spaced from the wall of the housing 10 permitting a passage 46 for the unobstructed movement of pressure into and through the valve housing. The trough 48 is adapted to support the liquid 24 and to receive the valve member 44 into and form sealing engagement as it reciprocates in response to vacuum conditions in the storage vessel. Like the trough seal 26 described above, this trough seal 48 also has a centrally disposed aperture 50 for the transmission of atmospheric pressure to the underside of the inverted bell type valve element 44.

The modified shape of the bell type element 44 follows the already detailed shape of the pressure valve element 30 in that the side wall 52 is terminated by a horizontal flange 54 and a vertical lip 56 which facilitates the operation as indicated. The vacuum relief valve element 44 is further modified to include a liquid reservoir 58 centrally positioned on its cover to receive the weighted guide rod 38 projecting from the pressure relief valve element 30 into sliding and sealed engagement with the guide tube 42. This liquid filled guide tube 42 is also weighted on the bottom as by weight 43 adjusted to permit the vacuum responsive valve element 44 to operate accurately and positively as required. A sealing liquid 60 of the same requirements as that already discussed for the trough seals 26 and 48 fills the liquid seal 58 and the tube 42 so as to completely embrace the guide rod 38 in liquid sealed contact.

The admission of atmospheric pressure to the underside of the vacuum relief valve element 44 through the centrally disposed aperture 50 in the trough seal 48 is made possible by means of the transverse passage 62. This passage extends across the housing 10, is closed to the peripheral space around the vacuum relief valve, but opens into the center positioned passage 50 through the aperture 51 (Fig. 3), so that at all times atmospheric pressure is in contact with the valve element 44. This transverse passage 62 together with the liquid seal trough 48 is mounted and positioned in the housing 10 by means of the spider 64 designed to engage the wall of the housing and support the vacuum valve elements.

In order to maintain the pressure and vacuum valve elements in proper alignment relative to the housing 10 and the respective trough seals, a receiving tube 66 is positioned in alignment with the rod 38 and the tube 42 which it receives in sliding engageemnt. In this illustrated form, the receiving tube 66 is shown fastened to the transverse passage 62 as a practical form of construction but may be otherwise designed if desired. In addition, to prevent the lifting of the vacuum relief valve 44 by internal pressures in the tank, the tube 66 is sealed on its lower end by the cap 68, and consequently, as it opens into the transverse passage 62, is never affected by any pressure other than atmospheric. A liquid 63 fills the receiving tube 66 and is retained therein also by the cap 68. This liquid acts both as a seal and also prevents sticking by freezing of condensation common in valves of this type subjected to the weather elements.

In operation the pressure and vacuum relief elements are selected for the particular pressure vessel on which the device is to be installed and the weights 40 and 43 affixed. The vacuum venting valve 44 is lowered into sealing contact with the liquid 24 in the trough 48, with the tube 42 projecting downwardly into sliding engagement with the liquid filled, sealed receiving tube 66. Sealing liquid 60 is poured into tube 42 through the sealing liquid reservoir 58 on top of the valve element 44. The weighted rod 38 of the pressure relief valve 30 is inserted therein and the inverted bell type valve element 30 lowered into sealing engagement with the liquid 22 in the peripheral trough 26. With the normal positions of the pressure relief valve in sealing contact with the liquid in trough 26, the housing 10 is closed and retains the volatile constituents existing in the excess pressure vessel 14 until an excess of pressure or vacuum occurs. Except when relieving excessive pressures, the valve element 30 remains in contact with the sealing liquid 22 and completely covers the central passage 28 through the trough seal 26.

Reference is made to Figure 4 for the detailed explanation of the relief of excess pressures by the reciprocation of the liquid sealed valve element 30. The excess pressure in the pressure vessel 14 is transmitted upwardly into the valve housing 10 as shown around the peripherally spaced liquid seal trough 48 of the vacuum relief valve 44 indicated by the arrows in Figure 4, and exerts an upward pressure on the underside of the valve element 30. When this pressure is great enough to lift the valve element 30 against the combined resistance of the weight of the valve element structure, the guide tube 38, the weight 40, pressure of the sealing liquid on the outwardly extending flange 34, and the final suction of the sealing liquid on the underside of the flange 34 as the liquid is held within the lip 36, the valve element 30 is lifted suddenly from the seal to permit immediate relief of the excess pressure. The height of the upward movement of the valve element 30 and the clearance above the liquid seal will depend primarily upon the force of the excessive pressure and the controlling weights of the additional elements noted above. It will be clear, however, that the very structure of this modified inverted bell type form of valve requires that the valve element be entirely free of the liquid before the pressure is relieved. This substantially decreases entrainment of the sealing liquid which reduces the maintainance required for this type of valve.

As the valve element 30 moves upwardly within the housing 10 to relieve the excess pressure of the pressure vessel, the guide rod 38 with the attached weight 40 also moves upward in the liquid seal which encloses it in the guide tube 42. The lubricating-sealing liquid 60 contained in the tube 42 and reservoir 58 moves into the vacated volume left by the upward movement of guide rod 38. It remains in the lower portion of tube 42 until displaced upwardly by the return of rod 38 when valve 30 resumes the closed position. The length of this guide rod 38 is sufficient that it will not move upwardly far enough to lift out of the guide tube 42 but will remain engaged even at the most extended height of operation. It is evident that the excess pressure once relieved will no longer support the valve element 30 in the relieving position and that it will be returned to normal contact with the sealing liquid 22 in the trough 26 by the action of its own weight plus the added weight 40 on the bottom of the guide rod 38 and the other attachments.

During the operation for the relief of excess pressure, the pressure effect is transmitted throughout the body of the housing 10 and exerts a downward pressure on the vacuum vent valve element 44 enclosed in the liquid seal trough 48 and in sealing engagement with the liquid 24 therein. It will be remembered that the transverse passage 62 and the seal 68 on the bottom of the receiving tube 66 is designed and arranged to prevent this excess pressure from being admitted under the valve element 44 which is always subjected to atmospheric pressure. The excess storage vessel pressure being greater than atmospheric pressure tends to force the valve element 44 downward into more secure sealing relation with the sealing liquid 24 during the excess pressure relief operation. This is illustrated in Figure 4 by showing the liquid seal inside the vertical walls 52 of the valve element 44 at a higher elevation than the liquid outside that wall.

In the vacuum relief operation, however, as shown in Figure 5 the negative pressure of the storage vessel is transmitted into the body of the housing 10 and exerts a negative pressure on the underside of the pressure valve element 30 and on the upperside of the vacuum relief valve 44. The result of this pressure effect is to permit the atmospheric pressure on the top of the valve element 30 to force that valve element down further into the seal liquid 22 in the trough 26. This same relation between atmopheric pressure and vacuum, or negative pressure, working in the reverse on the valve element 44 lifts that element clear of the liquid seal 24 in the trough 48 and admits air under atmospheric pressure through the transverse passage 62 and aperture 51 around the valve element 44 and down into the storage vessel after passage through the trough seal 48.

The effect of the flange 54 and the lip 56 as part of the inverted valve element 44, the liquid seal 60 in conjunction with the guide tube 42, and the weight 43 all act as a deterring effect upon the operation of the valve element 44 prior to vacuum relief. The liquid seal 24 in addition to presenting a depth of liquid above the flange 54, the static head of which must be overcome together with the suction effect of leaving the liquid caused by the lip section 56 and the flange 54, also presents the means for accentuating the relieving function of the valve elements in a sharp, emphatic manner.

The explanation of this rapid valve action desired in the art, particularly where volatile liquids escape from the stored material, is due to the same flange element construction in both valves and will be considered together. When either of the valve elements 30 or 44 have been lifted to the elevation in the liquid seal where the outwardly extending flange is flush with the surface, the next small increment of lift permitting the pressure to get between the flange and the liquid surface so increases the operating area which is now affected that a sharp lifting movement suddenly moves the valve element clear of the liquid seal and permits immediate relief of vacuum or pressure. This lip and flange construction on the vented valve member prevents the escape of the pressure gas or atmosphere as in bubbling and utilizes the pressure to suddenly operate the device. By thus rapidly increasing the effected area and directing the operating pressure into abrupt contact therewith, the desired relieving operation is achieved.

Continuing with the vacuum venting operation as shown in Figure 5, the upward movement of the valve element 44 moves the guide rod 38 of the valve element 30 relatively downwardly into the guide tube 42 because of the upward movement of the vacuum vent valve element 44. Thus the guiding elements remain effectively joined together in sliding engagement. Also the tube 42 weighted by weight 43 is retained in balance and in control of the valve element 44 by the fixed position of the receiving tube 66, liquid filled, which is, as described above, placed in alignment with these guiding elements and intended to preserve the operating position of the valves.

It will be recognized that a pressure-vacuum relief system such as described here possesses many advantages. The single housing opened at both ends in which the vacuum and pressure relief valves cooperate overcomes the objection of the centrally or T connected device now known. The transmission of the operating pressures around the vacuum relief valve and effectively causing operation of both valves depending upon the condition to be relieved reduces manufacturing and maintenance costs. The guide and weight features together with the pressure responsive flanges on the bell type valve element give a more precise and rapidly operating device than present structures.

I claim:

1. A fluid pressure regulator for storage tanks comprising a housing open at its upper end portion to the atmosphere and open at its lower end to allow fluid communication with the tank when applied thereto, the housing having an annular upper trough containing a sealing liquid, a bell type pressure-relief valve the depending flanged periphery of which is adapted to extend below the level of the sealing liquid and prevent passage of fluid from below the valve to the space above the valve, the housing having an annular lower trough, spaced from the housing wall and containing a sealing liquid and providing in the annular space between the lower trough and the housing wall a fluid passage, a bell type vacuum-relief valve the depending flanged periphery of which is adapted to extend below the level of the sealing liquid in the lower trough, means providing a passage placing the underside of the vacuum-relief valve in communication with the atmosphere; said pressure-relief valve being liftable by excess pressure in the tank out of sealing contact with the sealing liquid in the upper trough to allow said excess pressure to be relieved by flow of gas or vapor from the tank through the annular space around the lower trough and around the flange of the lifted pressure-relief valve; said vacuum relief valve being lifted by the pressure of the atmosphere below it against reduced pressure, out of sealing contact with sealing liquid in the lower trough to allow atmospheric air to flow around the flange of the lifted vacuum-relief valve and thence down through the annular passage surrounding the lower trough to the opening in the lower end of the housing; a vertically extending guide rod connected to the roof of the pressure-relief valve and extending downward therefrom, a vertically extending tube containing a liquid attached to the roof of the vacuum-relief valve and extending downward therefrom and sealed at its lower end, said guide rod extending into said tube and slidable relatively thereto in the upward movement of either valve, and a second vertically extending tube containing a liquid into which the first named tube extends and is slidable vertically therein in the specified lifting movement of the vacuum-relief valve.

2. A relief valve for storage vessels comprising a housing open at the top and bottom for the relief of pressures therethrough; a pressure relief valve positioned therein including a trough containing a liquid peripherally engaging said housing and allowing a passage for the transmission of pressure through the center thereof, and a reciprocatory bell type valve element extending downwardly into sealing relation with the liquid in said trough normally sealing the center passage; a vacuum relief valve positioned below said pressure relief valve in said housing including a trough containing a liquid spaced from the periphery of said housing and providing a centrally disposed passage therethrough permitting upward passage of pressures through and around said trough, and a reciprocatory bell type valve element extending downwardly into sealing relation with the liquid in said trough normally sealing the central passage therein from the interior of the housing; a guide rod connected to and extending downwardly from the pressure relief valve element; a guide tube containing a liquid attached to and extending through the vacuum relief valve element into sealing engagement with said guide rod; means forming a passage extending transversely of said housing enclosing said central passage in the trough seal of the vacuum relief valve to admit atmosphere exclusively; and liquid containing tubular means suspended from said passage means positioned to receive the valve member guiding elements in sealed operating relation.

3. A relief valve for storage vessels comprising a housing open at the top and bottom for the relief of pressures therethrough; a pressure relief valve positioned therein including a trough containing a liquid peripherally engaging said housing and allowing a passage for the transmission of pressure through the center thereof, and a reciprocatory bell type valve element extending downwardly into sealing relation with the liquid in said trough normally sealing the center passage; a vacuum relief valve positioned below said pressure relief valve in said housing including a trough containing a liquid spaced from the periphery of said housing and providing a centrally disposed passage therethrough permitting upward passage of pressures through and around said trough, and a reciprocatory bell type valve element extending downwardly into sealing relation with the liquid in said trough normally sealing the central passage therein from the interior of the housing; a guide rod connected to and extending downwardly from the pressure relief valve element; a guide tube containing a liquid attached to and extending through the vacuum relief valve element into sealing engagement with said guide rod; liquid supporting means below said vacuum relief valve aligned with said guide rod and tube to position the valve elements in operating relation with the troughs and said housing; and means forming a passage to admit atmosphere only extending transversely of said housing enclosing said central passage in the trough seal of the vacuum relief valve.

4. A relief valve for storage vessels comprising a housing; a pressure relief valve positioned therein including a trough containing a liquid peripherally engaging said housing and allowing a passage for the transmission of pressure through the center thereof, and a reciprocatory bell type valve element extending downwardly into sealing relation with the liquid in said trough normally sealing the center passage; a vacuum relief valve positioned below said pressure relief valve in said housing including a trough containing a liquid spaced from the periphery of said housing and providing a centrally disposed passage therethrough permitting upward passage of pressures through and around said trough, and a reciprocatory bell type valve element extending downwardly into sealing relation with the liquid in said trough normally sealing the central passage therein from the interior of the housing; a guide rod connected to and extending downwardly from the pressure relief valve element through the central passage of the trough; a guide tube containing a liquid attached to and extending through the vacuum relief valve element in alignment with and into sealing engagement with said guide rod; means forming a passage extending transversely of said housing enclosing said central passage in the trough seal of the vacuum relief valve for constant and exclusive communication with the atmosphere; and a receiving tube containing liquid sealed on the lower end suspended from the transverse passage means in alignment with and adapted to receive the guide rod and tube of the valves in sliding engagement to register the valve elements as they operate to relieve pressures.

5. A relief valve for storage vessels comprising a housing open at the top and bottom for the relief of pressures therethrough; a pressure relief valve positioned therein including an upper trough containing a sealing liquid peripherally engaging said housing and allowing a passage therethrough for the transmission of pressures, a bell type valve element extending downwardly into sealing relation with the liquid in said trough, and a guide rod connected to said bell type valve element extending downwardly concentric of said housing through the trough passage; a vacuum relief valve in said housing including a lower trough containing a liquid to form a seal concentrically positioned in said housing below the upper trough and spaced from the periphery thereof permitting tank pressures to pass upwardly around the valve, and providing a centrally disposed passage for the passage of pressure through the lower trough, a bell type valve element extending downwardly into sealing relation with the liquid in said lower trough normally sealing the central passage therethrough, and a tube containing a sealing liquid connected to the valve element extending downwardly therefrom through the lower trough passage and aligned to slidably receive the downwardly extending pressure valve guide rod in liquid sealed engagement; a passage extending transversely of said housing below the lower trough and enclosing the centrally disposed passage therein to transmit atmospheric pressure only under the valve element; and a liquid filled receiving tube sealed on the lower end suspended from the transverse passage in alignment with and adapted to receive the guide rod and tube of the valves in sliding engagement to register the valve elements as they operate to relieve pressures.

6. A pressure relief valve for storage vessels comprising a housing divided into upper and lower chambers and open at the top and bottom for the relief of pressures therethrough; a trough with a sealing liquid therein forming a seal peripherally engaging the housing, dividing said housing into upper and lower chambers and having a central opening to form a passage through said trough; a reciprocatory valve member positioned to operably engage the liquid seal having a cover portion extending across the central opening through the trough, side walls extending downwardly from said cover into the liquid seal and a peripheral flange extending outwardly from the side wall to increase the effective pressure area of said valve member; a positioning rod, weighted at its lower end, extending downwardly from and connected to the cover portion of said valve member concentric of the housing; a second trough containing a sealing liquid in the lower chamber peripherally spaced from the housing to provide a passage for the transmission of pressures therearound, having a centrally disposed aperture therethrough; a second reciprocatory valve member positioned to operably engage said second trough seal having a cover portion extending across the centrally disposed aperture in the second seal, side walls extending downwardly from the cover of said valve into the sealing liquid and a peripheral flange extending outwardly from the side wall thereof; a hollow tube connected to the cover portion of said second valve member concentric of the housing and positioned to receive the weighted rod depending from said first valve member, said hollow tube also being weighted to position the second valve member in operating relation with the first valve member and containing a liquid to seal the rod of the first valve member; a conduit extending transversely across said housing through the lower chamber and embracing the aperture through the trough seal below the cover of the second valve for the admission of atmosphere only under the valve member, and a tube containing liquid and sealed at the lower end extending downwardly from the transverse conduit and concentric of the housing to receive and position the weighted rod and tube of the respective valves.

References Cited in the file of this patent

UNITED STATES PATENTS

| Number | Name | Date |
|---|---|---|
| 1,585,276 | Atwell | May 18, 1926 |
| 1,918,337 | Jones | July 18, 1933 |
| 1,929,462 | Woidich | Oct. 10, 1933 |
| 2,527,892 | Quist | Oct. 31, 1950 |

FOREIGN PATENTS

| Number | Country | Date |
|---|---|---|
| 18,715 | Sweden | Dec. 24, 1904 |